Patented July 8, 1941

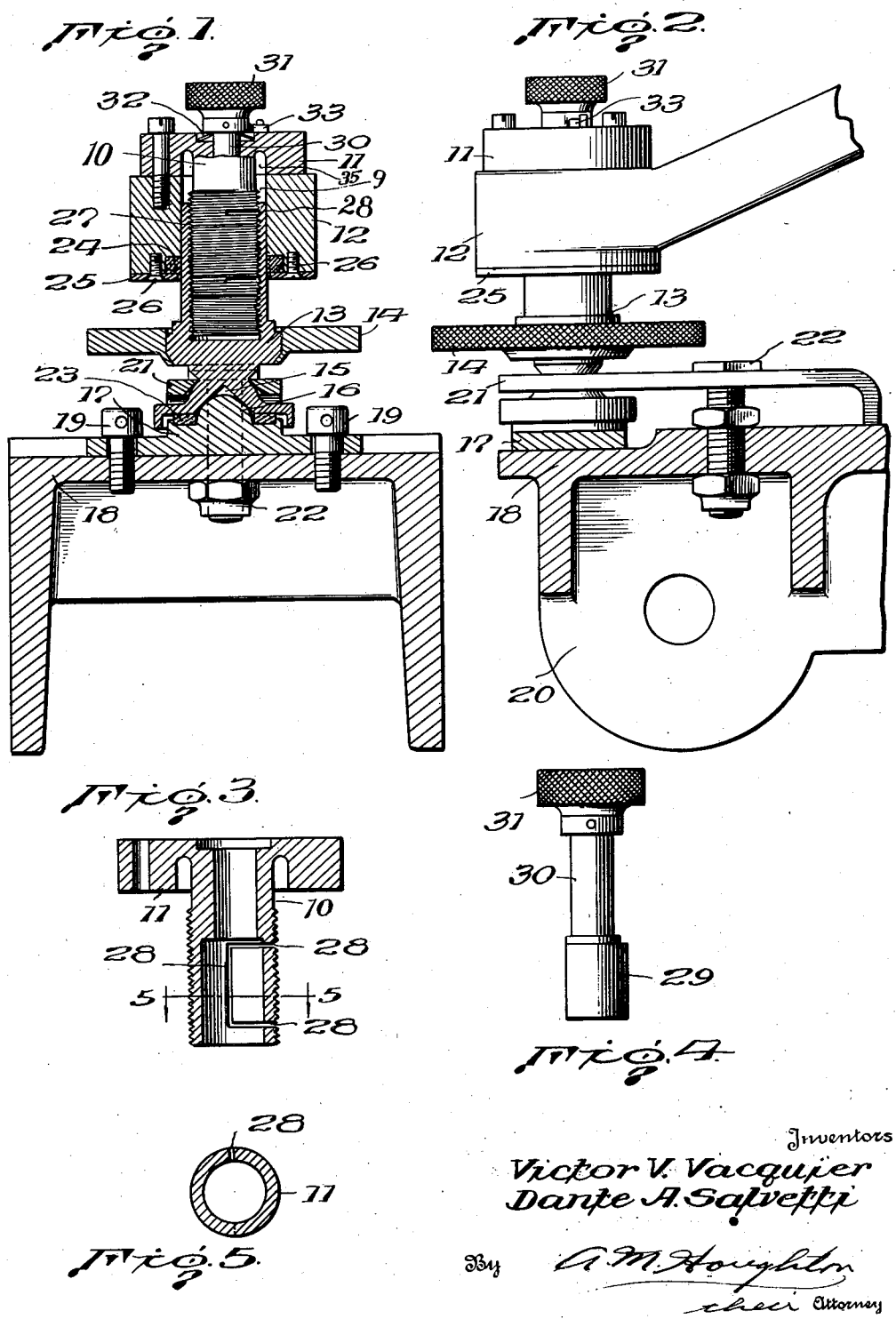

2,248,209

UNITED STATES PATENT OFFICE 2,248,209

LEVELING DEVICE

Victor V. Vacquier, Oakmont, and Dante A. Salvetti, Blawnox, Pa., assignors to Gulf Research & Development Company, Pittsburgh, Pa., a corporation of Delaware Application January 22, 1941, Serial No. 375,526

6 Claims. (Cl. 248—180)

This invention relates to leveling devices; and it comprises a screw type device for supporting and leveling an instrument or part thereof on a base, said device having a downwardly extending male threaded member in fixed relation to the instrument, a rotatable female threaded sleeve in pivotal relation to the base and engaging and surrounding the male threaded member and means in fixed relation to the instrument affording a dust-proof seal around the sleeve; all as more fully hereinafter set forth and as claimed.

Instruments such as transits are ordinarily leveled by a plurality of screws—three or four—which are attached in pivotal relation at one end to a fixed base such as a tripod head and which have their threaded portion in threaded engagement with the instrument or instrument frame. The threads of the usual type of leveling screw are exposed to the atmosphere and considerable difficulty has been experienced in that the exposed threads wear out quickly. Dirt, grit and other foreign matter stick to lubricants on the threads and cause irregular action of the screws and rapid wear.

Attempts have been made to provide a leveling screw that is protected from foreign matter and thereby lessen the wear upon the threads and increase the life of the screw. One proposed expedient takes the form of a metal cap which is threaded into a metal socket at the exposed end of the screw threads. In this type of screw it is necessary to remove the protective covering to apply the necessary lubricant. This may permit entry of foreign matter into the threaded portion of the screw in dusty country. Another type of protective covering employed is a spirally wound expansible tube. This does not insure complete protection, for dirt and grit may work through the openings in the spiral.

The main object of the present invention is to provide a leveling screw of such construction that the bearing surfaces and especially the threads are lubricated and protected from dirt. In addition, the mechanism is constructed with materials so chosen and so assembled that only the less expensive parts are subjected to most of the wear. Another feature of the invention is the provision of a means whereby the wear on the threads can be gradually taken up so that the screw fits snugly at all times. This particular feature of the invention also enables one to clamp the mechanism in a set position. This is especially advantageous when the mechanism is a part of an instrument which is used for measuring horizontal angles with great precision.

These and other objects and advantages of the invention are achieved by a construction wherein a manually operable rotatable sleeve is provided, pivoted to the base and threaded on the inside to engage a threaded male member fixed to the instrument frame which last usually takes the form of a spider. By this expedient the threads are enclosed within the walls of the sleeve and are protected from dirt. The sleeve is arranged to enter a tubular socket in the instrument frame, from the top of which the male screw projects, to protect the upper end of the sleeve. Annular lubricating sealing means at the bottom of the socket engage the sleeve in packing relation.

By this arrangement the threaded portions of the two members are at no time exposed even though the threads of the male member at some positions extend beyond the sleeve. All portions of the threads of the male member in all positions of adjustment are still protected by means of a socket or similar means integral with the base. The male threaded member contains saw-cuts which form an expansible portion. The male member is also hollow so that it may receive a cam which upon being turned by hand expands the expansible portion of the male member. Thus the wear on the threads may be gradually taken up. In addition, lubricating and sealing means are located at the lower end of the spider thus making it possible to lubricate the bearing surfaces without disassembling the mechanism. Other lubricating means are provided for lubricating the friction surface between the female member and the instrument base.

In the accompanying drawing there is shown, more or less diagrammatically, one example of a specific embodiment of apparatus within the purview of the invention.

Referring to the drawing:

Fig. 1 is a view, partly in vertical section and partly in elevation, of a screw assembly embodying the invention;

Fig. 2 is a side elevation of the leveling screw assembly;

Fig. 3 is a sectional view in detail of the male threaded member;

Fig. 4 is a front elevation in detail of the locking means employed; and

Fig. 5 is a horizontal section taken along the line 5—5 of Fig. 4.

To illustrate our invention we have shown in the drawing a typical leveling screw assembly combined with the tripod head of a surveying instrument.

Referring to the drawing, a male threaded member 10 integral with a discoid closure 11 is attached to a spider 12 which carries the instrument (not shown) to be supported and leveled. A female threaded hollow sleeve 13, in threaded engagement at 27 with the male threaded member, carries a hand wheel 14. The sleeve extends into a bore 9 in member 12, which thus forms a socket to receive the sleeve, covered by closure 11. The closure is annularly recessed at 35 to receive the upper end of the sleeve.

At the bottom of the sleeve 13 is a conical depression 15 which rests upon a hemisphere 16 of a pad 17 which is attached to a base plate 18 by screws 19. The base plate 18 carries a socket 20 for a wooden tripod leg (not shown). The threaded hollow sleeve 13 is held in contact with the pad 17 by means of a leaf spring 21, adjustable as to pressure of contact by means of the bolt and nut arrangement 22 as illustrated in Fig. 2. A lubricated washer 23 prevents dirt from penetrating to the bearing surface between the threaded hollow sleeve 13 and the base 18. This washer is advantageously made of felt, but may be made of any similar material. A similar washer 24, retained by a ring 25 which is attached to the spider 12 by means of the screws 26, prevents foreign matter from working up on to the threads 27. The sleeve is very completely protected from dirt by the socket (bore 9) and this washer.

As is best shown in Figs. 3 and 5, the threaded male member 11 is hollow and slotted with saw cuts 28. An eccentric cam 29 which can be rotated by turning its upper extension 30 by means of the knurled knob 31 is used to spread slightly the slotted section of the male threaded member. By this means the clearance between the threaded members may be adjusted. A spring washer 32 prevents the cam 29 from changing its position once set. By the same action the screw can be tightly clamped. A stop 33 is attached to the top end of the male threaded member.

In operating the leveling screw assembly in conjunction with a surveying instrument, for example, the tripod head is approximately leveled in the usual way and then the instrument is leveled by means of the screw mechanism. This is accomplished by turning the hand wheel 14 which causes the male member to be drawn downwardly or forced upwardly as desired. As the screw threads wear because of length of service the eccentric cam 29 may be turned by means of the knurled knob 31 and the slotted portion of the male member is forced into closer engagement with the threaded hollow sleeve. The threaded members may be locked by means of this eccentric cam.

Most of the bearing surfaces and especially the threads are lubricated and protected from foreign matter. Furthermore, the materials are so chosen that only the parts of lowest precision requirements (and therefore of least cost) are subjected to wear.

The apparatus is embodied in brass or other suitable material commonly used in the construction of instruments of the type described.

What we claim is:

1. In a screw type device for supporting and leveling an instrument on a base, a downwardly extending male threaded member in fixed relation to the instrument, a rotatable female threaded sleeve in pivotal relation to the base and engaging and surrounding the male threaded member, and means affording a dust-proof seal between the sleeve and the instrument.

2. In a screw type device for supporting and leveling an instrument on a base, a downwardly extending male threaded member in fixed relation to the instrument, a rotatable female threaded sleeve in pivotal relation to the base and engaging and surrounding the male threaded member, said instrument being provided with a socket portion closely surrounding the female threaded sleeve, and annular sealing means between the instrument and the sleeve.

3. In a screw type device for supporting and leveling an instrument on a base, a downwardly extending male threaded member in fixed relation to the instrument and having a closure member in fixed relation therewith, a rotatable female threaded sleeve in pivotal relation to the base and engaging and surrounding the male threaded member, said instrument being provided with a socket portion closely surrounding the female threaded sleeve and closed at the upper end by said closure member, and annular sealing means between the instrument and the sleeve.

4. In a screw type device for supporting and leveling an instrument on a base, a male threaded member and a female threaded sleeve member engaging the male threaded member and enclosed on the end opposite the end engaging the male threaded member, one of said members being in fixed relation to the instrument and the other being in pivotal relation to the base, socket means telescopically enclosing the end of the sleeve member opposite the end which engages the male threaded member and annular sealing means between the socket means and the outer periphery of the sleeve member.

5. In a screw type device for supporting and leveling an instrument on a base, a downwardly extending hollow male threaded member in fixed relation to the instrument and having an expansible portion therein, a rotatable female threaded sleeve in pivotal relation to the base and engaging and surrounding the male threaded member, means extending into the male member for expanding the expansible portion of the male threaded member and means affording a dust-proof seal between the sleeve and the instrument.

6. In combination with an instrument and a base therefor, a leveling screw assembly comprising a downwardly extending hollow male threaded member in fixed relation to the instrument and having an expansible portion therein, a rotatable female threaded sleeve in pivotal relation to the instrument base and engaging and surrounding the male threaded member, a cam extending within the hollow male threaded member for expanding the expansible portion thereof and combined means for lubricating and sealing the exterior surface of the sleeve most subject to wear.

VICTOR V. VACQUIER.
DANTE A. SALVETTI.